Figure 1:
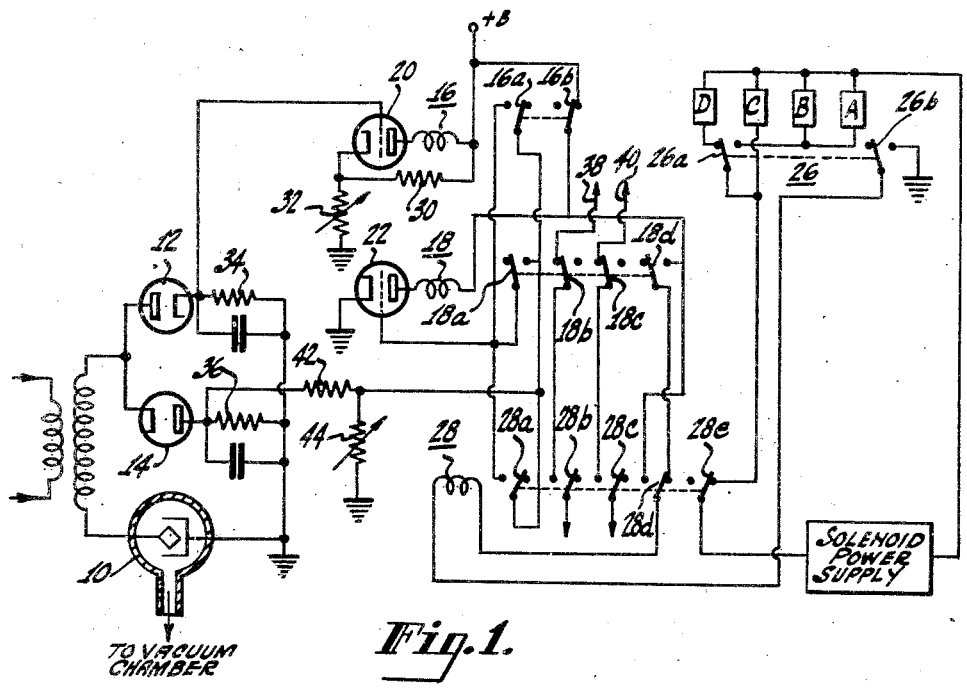

April 26, 1955

H. F. SCHNEIDER 2,707,249

DISCHARGE GAGE CONTROL OF VACUUM SYSTEMS

Filed Feb. 2, 1951

2 Sheets-Sheet 1

INVENTOR
HELMUTH F. SCHNEIDER
BY
ATTORNEY

April 26, 1955     H. F. SCHNEIDER     2,707,249
DISCHARGE GAGE CONTROL OF VACUUM SYSTEMS
Filed Feb. 2, 1951     2 Sheets-Sheet 2

INVENTOR
HELMUTH F. SCHNEIDER
BY
ATTORNEY

United States Patent Office 2,707,249
Patented Apr. 26, 1955

2,707,249

DISCHARGE GAGE CONTROL OF VACUUM SYSTEMS

Helmuth F. Schneider, Westville, N. J., assignor to Radio Corporation of America, a corporation of Delaware Application February 2, 1951, Serial No. 209,083

6 Claims. (Cl. 315—110)

This invention relates to electrical apparatus for automatically controlling a series of sequential operations and, more particularly to apparatus for automatically controlling high-vacuum pumping systems of the type employing a mechanical fore pump and an oil diffusion fine pump.

Heretofore, automatic control systems for vacuum pumping apparatus have been proposed in which the successive steps of the operation are under the control of a plurality of pressure sensitive devices. An example of such a system is shown in U. S. Patent 2,522,969 wherein two pressure sensitive devices of different types are employed to effect the desired control. One of these pressure sensitive devices is a thermocouple type vacuum gauge, while the other is an ionization type vacuum gauge such as the one known in the art as a Phillips gauge and shown in U. S. Patent 2,490,468.

In these previous systems, it was necessary to employ a plurality of pressure sensitive devices to control the sequential operations because of the inherent characteristics of the various vacuum gauges. The thermocouple type gauge is inaccurate except in the presence of an absolute pressure of about 10 microns of mercury. The ionization type or Phillips gauge produces a double valued current curve. That is, the conductivity of the gauge is the same for two values of pressure.

It is an object of the present invention to provide a system for controlling a series of sequential operations from control voltages obtained from a single vacuum gauge.

Another object of the present invention is to provide a system as set forth wherein the single gauge is an ionization type gauge.

It is a further object of the present invention to provide means for automatically controlling high-vacuum pumping systems of the type employing a rough or fore pump and a fine pump in response to information obtained from a single vacuum gauge.

Still another object of the present invention is to provide an automatic control means as set forth and which includes the automatic starting of a work function within a chamber evacuated by said pumping system upon the attainment of a predetermined vacuum.

In accomplishing these and other objects, there is provided, in accordance with the present invention, a plurality of relays which control electrical circuits to operate the valves of a vacuum pumping system and which also controls electrical circuits to a work performing means within a chamber evacuated by the pumping system. The relays are, in turn, operated by the conduction of a pair of vacuum tubes. The output of an ionization type vacuum gauge is rectified and divided into a positive and negative voltage component which is used to control the conduction of the aforesaid vacuum tubes.

Figures 3A, 3B, 3C:
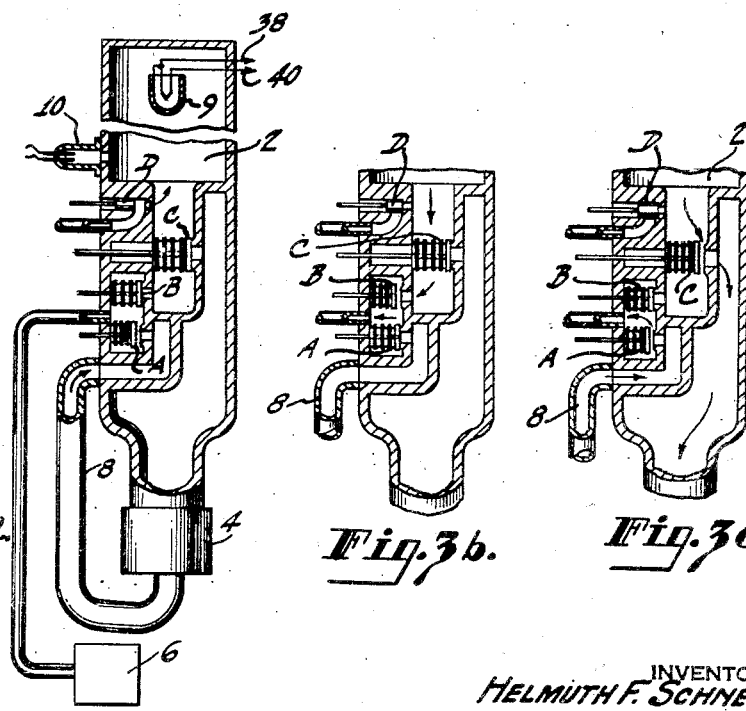
Figure 2A:
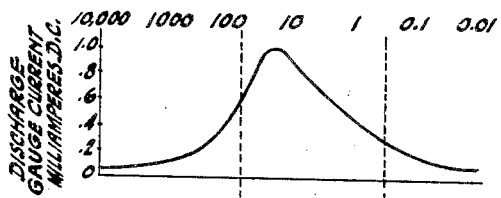
Figure 2B:
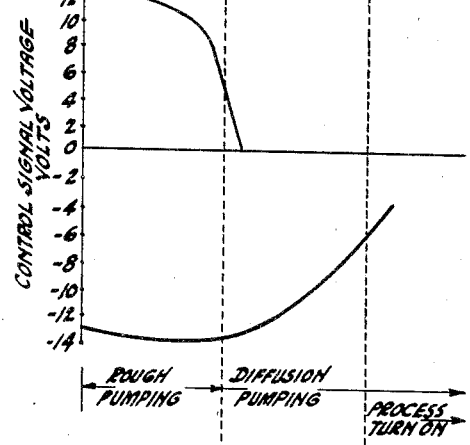
Figure 2C:
Figure 2D:
Figure 2E:
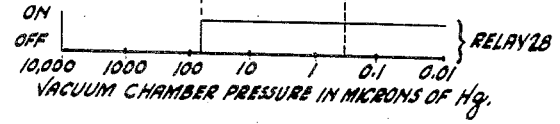

A better understanding of the present invention may be had from the following detailed description, when read in connection with the accompanying drawings in which:

Figure 1 is a schematic diagram of a circuit constructed in accordance with the present invention, Figure 2a is a diagram illustrating the conductivity characteristic of an ionization type pressure gauge, Figure 2b is a diagram showing the positive and negative voltage components of the rectified output of the ionization vacuum gauge, Figures 2c, d, and e are diagrams showing the on-off relationship of the three relays shown in Figure 1 with respect to the pressure in the vacuum chamber, and Figures 3a, 3b and 3c are diagrammatic cross-sectional views of a typical vacuum chamber showing valve positions for different operating conditions.

Referring now to the drawings in more particularity, a typical embodiment of the invention will be described in connection with the evacuation, to a high degree, of a vacuum chamber which may be the column of an electron microscope, although it obviously could be any other piece of equipment in which it is desired to obtain a condition of high vacuum.

In Figure 3a, there is shown a typical system to which the present invention may be applied and in which an evacuable chamber 2 has an extension which contains three openings. To one of these openings there is connected an oil diffusion pump 4. This opening may be closed or opened by operation of a valve C. A second opening connects the evacuable chamber 2 to a fore or rough pump 6. The second opening may be closed or opened by a valve B. The third opening in the extension of the evacuable chamber connects that chamber to the atmosphere. A third valve D is operable to open or close this last mentioned opening. A fourth valve A opens or closes an opening which connects the outlet 8 of the diffusion pump 4 to the fore pump 6. The four valves are operated by correspondingly identified valve solenoids A, B, C and D shown schematically in Figure 1. The solenoids are, in turn, energized or de-energized in accordance with conditions prevailing in the vacuum chamber 2 (as hereinafter set forth) under the control of an ionization type vacuum gauge 10 schematically shown in Figures 1 and 3a.

In operating the system, in which the vacuum chamber 2 may, for example, be the column of an electron microscope, the valves, as shown in Figure 3a, are set for the "load" position. That is, under the conditions there shown, a specimen may be inserted or removed from the evacuable chamber. The valve A is open and the valve B is closed, connecting the intake of the fore pump 6 to the outlet 8 of the diffusion pump 4. The intake of the diffusion pump is isolated from the evacuable chamber because the valve C is closed. The valve D is open, through which air is admitted to the chamber establishing a pressure inside the chamber substantially equal to that of the surrounding atmosphere.

To reduce the pressure in the chamber in preparation for the examination of a specimen, the valve D is closed, the valve C remains closed, the valve B is opened, and the valve A is closed, as shown in Figure 3b. In this condition, the evacuable chamber 2 is isolated from the atmosphere and is connected to the fore pump 6 which begins the evacuation of the chamber. When the pressure in the chamber has been reduced to a suitable degree (say, an absolute pressure sufficient to sustain a column of mercury of about 60 microns), the valves are operated to present the condition shown in Figure 3c, wherein the valve D remains closed, the valve C is opened, the valve B is closed and the valve A is opened. In this condition, the diffusion pump 4 takes over the operation of continuing the evacuation of the chamber 2.

After the diffusion pump 4 has reduced the pressure in the chamber to a desired point (say, 0.3 micron of mercury), the power to the work performing means within the chamber 2 is turned on. As applied to an electron microscope, this step would include turning on the high voltage to an electron gun 9.

Heretofore, the above steps were performed manually, or under the control of a plurality of pressure gauges. In accordance with the present invention, the steps of the operation are performed automatically under the control of a single pressure gauge.

As shown in Figure 1, a source of alternating current is applied to the electrodes of an ionization type pressure gauge 10 the output of which is rectified through a pair of diodes 12 and 14. A pair of relays 16 and 18, the contacts of which control the operation of the aforementioned steps, are energized, respectively, through a pair of vacuum tubes 20 and 22 having control grids. The rectified output of the first diode 12 is applied to the control grid of the vacuum tube 20. The output of the other diode 14 is applied through contacts 16a or 18a of the relays 16 and 18 to the control grid of the second vacuum tube 22. One terminal of each of the valve operating solenoids A, B, C and D, corresponding to the similarly identified valves, are connected to one side of a solenoid power supply 24. The valves A and C are so arranged that they are open when their associated solenoids are de-energized. Valves B and D are arranged so that they are closed when their respective solenoids are de-energized. The circuits to solenoids A and B are completed through the right hand member of contact 26a of double-pole, double-throw switch 26 and the right hand member of contact 28e of a third relay 28. The circuit to solenoid C is completed through the right hand member of contact 28e of the relay 28. The circuit to solenoid D is completed through the left hand member of contact 26a of the switch 26 and the right hand member of contact 28e of the relay 28. The energizing circuit for the relay 28 is completed through the right hand member of switch contacts 26b, contacts 28d, the right hand member of contacts 18d and 16b.

The first vacuum tube 20 is normally biased to cut off by adjustment of a voltage divider comprising a pair of resistors 30 and 32. The other vacuum tube 22 is normally conducting since its cathode is grounded, there is no potential on the control grid and the B+ supply is connected to the plate through contact 16b.

As previously mentioned, the conductivity of the ionization type pressure gauge produces a double valued response curve substantially as shown in curve A of Figure 2. However, when the output of the ionization gauge is rectified there is produced a positive and negative voltage component as illustrated in curve B of Figure 2. The positive component is developed across a resistor 34 in the cathode circuit of the first diode 12 and is applied to the control grid of the first vacuum tube 20. The negative component is developed across a resistor 36 and is applied through the aforementioned contacts to the control grid of the second vacuum tube 22.

In the operation of a device such as an electron microscope, the initial position of the valves would be that which we call the "load" position. That is, the valves A and D are open, B and C are closed. The evacuable chamber 2 is open to the atmosphere and the fore pump 6 is connected to the outlet of the diffusion pump 4. The condition of the relay is as shown in Figure 1. That is, the first relay 16 is de-energized with its contacts closed on the right. The second relay 18 is energized with its contacts closed on the left. The third relay 28 is de-energized with its contacts closed on the right. The switch 26 is closed to the left. In this condition the solenoid C and D are energized from the solenoid power supply 24.

After a specimen has been loaded into the chamber, to initiate the evacuation of the chamber, the switch 26 is closed to the right or "operating" position. This de-energizes solenoid D, closing the corresponding valve and isolating the chamber from the atmosphere. Solenoids A and B are energized, thus respectively closing and opening those valves. This connects the fore pump to the evacuable chamber and starts the exhausting operation.

As soon as the pressure in the chamber starts to drop, the ionization current starts to flow through the vacuum gauge 10. The rectification of the current produces the positive and negative voltage components at the output terminals of the rectifiers 12 and 14. The positive voltage component is applied to the control grid of the first vacuum tube 20, overcoming the cut off bias and producing a state of conduction through the tube. Conduction through the tube energizes the relay 16, which in turn causes the contacts thereof to close on the left. The closing of the contact 16a on the left permits the application of the negative voltage component to the control grid of the second vacuum tube 22 which causes that tube to cease conducting. This in turn de-energizes the relay 18, causing the contacts thereof to close on the right.

This condition continues until the positive voltage current component decreases to a predetermined value which is established by the setting of the bias adjusting voltage divider, at which time the first vacuum tube 20 is cut off, de-energizing the relay 16 closing the contacts thereof on the right. The voltage divider, comprising the resistors 30 and 32, is preferably adjusted to cause the first vacuum tube to be cut-off at a potential corresponding to an absolute pressure within the chamber of about 60 microns of mercury. The second vacuum tube 22 remains cut-off because the negative voltage component is still applied to the control grid thereof through the right hand member of the contact 18a of the relay 18. When the contact 16b closes on the right, the energization circuit of the third relay 28 is completed through the right hand members of contact 16b, 18d, and 28d. When this relay is energized, the energization circuit thereof is complete through the left hand member of contact 28d and the right hand member of contact 16b. Thus the relay 28 is locked in.

The energization of the third relay 28 causes all of its contacts to be closed on the left, thus opening the circuit to all of the valve operating solenoids, in which condition valve A is open, valve B is closed, valve C is open and valve D is closed as shown in Figure 3c. In this condition the diffusion pump 4 takes over the operation of continuing the evacuation of the evacuable chamber 2. The fore pump 6 is connected to the outlet of the diffusion pump 4.

As the pressure continues to decrease under the influence of the diffusion pump, the positive voltage component disappears and the negative voltage component approaches zero. When the negative voltage component has decreased to a predetermined value (say one corresponding to an absolute pressure in the chamber of approximately 0.3 micron of mercury) the second vacuum tube again starts to conduct causing the relay 18 to be energized, closing the contacts thereof on the left. The point at which the conduction through the second vacuum tube is restored may be determined by an adjustment of a voltage divider comprising resistors 42 and 44. When both relays 18 and 28 are energized and the contacts thereof closed on the left, the power supply circuit to the work function within the vacuum chamber is completed through leads 38 and 40 and relay contacts 18b and 18c and 28b and 28c.

The diffusion pump maintains the extremely low pressure in the vacuum chamber during the operation of the work function. If, however, through any cause whatever, the pressure in the chamber should rise above the last mentioned predetermined value, the negative voltage component would reappear and be applied to the control grid of the second vacuum tube 22 through the left hand member of the contact 28a. This would cause the relay 18 to be de-energized, opening the circuit to the work function power supply. Thus serious damage to the equipment would be automatically avoided. After the work function in the vacuum chamber 2 has been completed, the switch 26 is thrown to the left or "load" position. This step resets all of the relays to the initial position from which the cycle of operation may be repeated.

In the aforementioned patent, 2,522,969, the desirability of opening and closing the valves in a particular order at each step of the operation is indicated. Although this order of operation may readily be achieved through the proper choice of relay contacts and valve operating solenoids, it has been found that the order of operation is not necessary, permitting the herein described, considerably simplified arrangement.

Although the invention has been illustrated as applied to the operation of an electron microscope, it may be applied just as well to any other type of vacuum equipment, either with or without further modification. For example, it may be applied to apparatus for depositing coating material by an evaporating technique of the general type shown in U. S. Patent 2,338,234.

Thus, it may be seen that there has been provided a simplified automatic control means for vacuum pumping apparatus of the type employing a fore or roughing pump and a diffusion type, fine pump, together with means for controlling the circuit to a work function means within the chamber evacuated by such pumps, the control being derived from information obtained from a single ionization type vacuum gauge connected to the vacuum chamber.

What is claimed is:
1. A vacuum system comprising an evacuable chamber, an ionization type vacuum gauge connected to said chamber, means for exhausting said chamber including a fore pump and a diffusion pump, valve means intermediate said chamber and said exhausting means for selectively connecting said pumps to said chamber, relay means connected to control the operation of said valves, a pair of vacuum tubes having control grids connected to control the operation of said relays, means in- cluding a pair of rectifiers for deriving a positive and negative voltage component from said ionization type vacuum gauge, and means for applying said components to said control grids, respectively, to control the conduction of said vacuum tubes in response to predetermined changes in the pressure within said chamber.

2. The invention as set forth in claim 1 characterized by the addition of means for performing an electrically operated work function within said chamber, and means including said relay means for controlling the operation of said work function in response to other predetermined values of said voltage components.

3. A circuit for controlling the evacuation of a chamber comprising a chamber, a vacuum gauge having a double valued current-vacuum characteristic coupled to said chamber, rectifier-including means coupled to said gauge deriving a first signal of one polarity down to a first predetermined pressure and a second signal of opposite polarity down to a second predetermined pressure, and electromechanical means coupled to said rectifier-including means and responsive to said first and said second signals for controlling the evacuation of said chamber.

4. A device substantially as claimed in claim 3 wherein said electromechanical means comprises a first vacuum tube means coupled to said first rectifier-including means, a second vacuum tube means coupled to said second rectifier-including means, said first and said second vacuum tube means responsive to said first and said second signals respectively, relay means coupled to said first and said second vacuum tube means and adapted to be actuated thereby, solenoid means coupled to said relay means and adapted to be actuated thereby, pump means coupled to said chamber, and valve means coupled between said chamber and said pump means and adapted to be actuated by said solenoid means.

5. In a vacuum pumping apparatus a control circuit comprising a double valued current-vacuum characteristic vacuum gauge, a first and a second rectifier coupled to said gauge, a first and a second output circuit comprising a resistor and a condenser in parallel coupled respectively to said first and said second rectifiers, a first vacuum tube coupled to said first output circuit and responsive to a positive signal, a second vacuum tube coupled to said second output circuit and responsive to a negative signal, a first relay coupled to said first vacuum tube, a second relay coupled to said second vacuum tube, a third relay controlled by said second relay, solenoid means controlled by said third relay means, an evacuable chamber, pump means coupled to said chamber, and a valve means coupled between said chamber and said pump means adapted to be controlled by said solenoid means whereby substantially continuous control is obtained in response to said gauge.

6. A device as claimed in claim 5 wherein means is provided for adjusting the cathode-anode current of said first vacuum tube and means is provided for by passing a variable portion of said negative signal to ground.

References Cited in the file of this patent

UNITED STATES PATENTS

| | | |
|---|---|---|
| 2,413,760 | Graf | Jan. 7, 1947 |
| 2,522,969 | Smith | Sept. 19, 1950 |